United States Patent
Park

(10) Patent No.: US 7,351,769 B2
(45) Date of Patent: Apr. 1, 2008

(54) DYNAMIC VULCANIZATION OF ELASTOMERS WITH IN-SITU POLYMERIZATION

(75) Inventor: Edward Hosung Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 604 days.

(21) Appl. No.: 10/765,493

(22) Filed: Jan. 26, 2004

(65) Prior Publication Data

US 2005/0165168 A1 Jul. 28, 2005

(51) Int. Cl.
  C08L 23/00 (2006.01)
  C08L 23/04 (2006.01)
  C08L 27/02 (2006.01)
  C08L 27/10 (2006.01)
  C08L 35/02 (2006.01)
  C08F 214/26 (2006.01)

(52) U.S. Cl. ............... 525/199; 525/200; 525/209; 525/224; 525/232; 525/240

(58) Field of Classification Search ............ 525/191, 525/199, 200, 224, 209, 232, 240
See application file for complete search history.

(56) References Cited

U.S. PATENT DOCUMENTS

| | | |
|---|---|---|
| 3,037,954 A | 6/1962 | Gessler et al. |
| 3,538,028 A | 11/1970 | Morgan |
| 3,580,889 A | 5/1971 | Barney et al. |
| 3,787,341 A | 1/1974 | Aron |
| 3,884,877 A | 5/1975 | Kolb |
| 4,035,565 A | 7/1977 | Apotheker et al. |
| 4,094,949 A | 6/1978 | Yokokawa et al. |
| 4,287,320 A | 9/1981 | Kolb |
| 4,311,628 A | 1/1982 | Abdou-Sabet et al. |
| 4,328,140 A | 5/1982 | Singletary et al. |
| 4,419,499 A | 12/1983 | Coran et al. |
| 4,450,263 A | 5/1984 | West |
| 4,451,542 A | 5/1984 | Ishida et al. |
| 4,530,881 A | 7/1985 | Santoso et al. |
| 4,572,516 A | 2/1986 | Symons et al. |
| 4,624,978 A | 11/1986 | Frayer |
| 4,656,228 A | 4/1987 | Richter et al. |
| 4,696,976 A | 9/1987 | Ellerbe, III et al. |
| 4,696,989 A | 9/1987 | Oka et al. |
| 4,696,998 A | 9/1987 | Brunelle et al. |
| 4,787,991 A | 11/1988 | Morozumi et al. |
| 5,006,594 A | 4/1991 | Rees |
| 5,095,072 A | 3/1992 | Kobayashi et al. |
| 5,108,780 A | 4/1992 | Pitt et al. |
| 5,206,293 A | 4/1993 | Sakai et al. |
| 5,219,931 A | 6/1993 | Siol et al. |
| 5,331,040 A | 7/1994 | Lee |
| 5,354,811 A | 10/1994 | Kamiya et al. |
| 5,371,143 A | 12/1994 | Novak et al. |
| 5,384,374 A | 1/1995 | Guerra et al. |
| 5,397,832 A | 3/1995 | Ellul |
| 5,407,984 A | 4/1995 | Brunelle et al. |
| 5,459,202 A | 10/1995 | Martinez et al. |
| 5,548,028 A | 8/1996 | Tabb |
| 5,585,152 A | 12/1996 | Tamura et al. |
| 5,639,810 A | 6/1997 | Smith, III et al. |
| 5,668,186 A | 9/1997 | Brunelle et al. |
| 5,700,866 A | 12/1997 | Tabb |
| 5,723,544 A | 3/1998 | Lee |
| 5,792,348 A | 8/1998 | Eisinga |
| 5,910,544 A | 6/1999 | Ozawa et al. |
| 5,962,589 A | 10/1999 | Matsumoto et al. |
| 6,048,939 A | 4/2000 | Priester |
| 6,054,537 A | 4/2000 | Shimizu et al. |
| 6,066,697 A | 5/2000 | Coran et al. |
| 6,079,465 A * | 6/2000 | Takeyama et al. .......... 152/510 |
| 6,114,441 A | 9/2000 | Spohn et al. |
| 6,147,158 A | 11/2000 | Chmielewski |

(Continued)

FOREIGN PATENT DOCUMENTS

| | | |
|---|---|---|
| CA | 2475263 | 9/2003 |
| CA | 2513789 | 8/2004 |
| EP | 0132583 | 2/1985 |
| EP | 0148719 | 7/1985 |
| EP | 0239707 | 10/1987 |
| EP | 0 168 020 B1 | 10/1989 |
| EP | 0422960 | 4/1991 |
| EP | 0432911 | 6/1991 |
| EP | 0439734 | 8/1991 |
| EP | 0254307 | 12/1991 |

(Continued)

OTHER PUBLICATIONS

Schmiegel, Walter W., "A Review of Recent Progress in the Design and Reactions of Base-Resistant Fluoroelastomers.", IRC, Jul. 2003.

(Continued)

Primary Examiner—Nathan M. Nutter
(74) Attorney, Agent, or Firm—Ronald W. Wangerow; Harness, Dickey & Pierce, PLC

(57) ABSTRACT

Processable rubber compositions comprising a vulcanized elastomer dispersed in a matrix of a thermoplastic polymeric material. In one embodiment the matrix forms a continuous phase and the vulcanized elastomeric material is in the form of particles forming a non-continuous phase. The compositions are made by combining a curative, an uncured fluorocarbon elastomer, and a reactive oligomer, and heating the mixture at a temperature and for a time sufficient to effect vulcanization of the elastomeric material and polymerization of the oligomer, while mechanical energy is applied to mix the mixture during the heating step. Shaped articles such as seals, gaskets, O-rings, and hoses may be readily formed from the rubber compositions according to conventional thermoplastic processes such as blow molding, injection molding, and extrusion.

34 Claims, No Drawings

U.S. PATENT DOCUMENTS

| | | |
|---|---|---|
| 6,162,385 A | 12/2000 | Grosse-Puppendahl et al. |
| 6,310,141 B1 | 10/2001 | Chen et al. |
| 6,312,639 B1 | 11/2001 | Ertle et al. |
| 6,369,157 B1 | 4/2002 | Winckler et al. |
| 6,407,174 B1 | 6/2002 | Ouhadi |
| 6,410,630 B1 | 6/2002 | Hoover et al. |
| 6,420,047 B2 | 7/2002 | Winckler et al. |
| 6,420,048 B1 | 7/2002 | Wang |
| 6,429,249 B1 | 8/2002 | Chen et al. |
| 6,436,548 B1 | 8/2002 | Phelps |
| 6,436,549 B1 | 8/2002 | Wang |
| 6,437,030 B1 | 8/2002 | Coran et al. |
| 6,500,374 B1 | 12/2002 | Akioka et al. |
| 6,525,164 B2 | 2/2003 | Faler |
| 6,624,251 B1 | 9/2003 | Chmielewski |
| 6,656,831 B1 | 12/2003 | Lee et al. |
| 6,663,966 B2 | 12/2003 | Mhetar |
| 6,774,171 B2 | 8/2004 | Kassa et al. |
| 6,872,325 B2 | 3/2005 | Bandyopadhyay et al. |
| 7,022,769 B2 | 4/2006 | Park |
| 7,029,750 B2 | 4/2006 | Takei et al. |
| 7,087,679 B2 | 8/2006 | Shimizu et al. |
| 7,098,270 B2 | 8/2006 | Hochgesang et al. |
| 2002/0091205 A1 | 7/2002 | Brewer et al. |
| 2002/0099142 A1 | 7/2002 | Faulkner |
| 2002/0113066 A1 | 8/2002 | Stark et al. |
| 2002/0122928 A1 | 9/2002 | Botrie et al. |
| 2002/0198320 A1 | 12/2002 | Chmielewski et al. |
| 2003/0026995 A1 | 2/2003 | Duchesne et al. |
| 2003/0138655 A1 | 7/2003 | Watanabe et al. |
| 2003/0166780 A1 | 9/2003 | Shimizu et al. |
| 2004/0183702 A1 | 9/2004 | Nachtigal et al. |
| 2004/0260023 A1 | 12/2004 | Park et al. |
| 2005/0014900 A1* | 1/2005 | Park ............................ 525/191 |
| 2005/0155690 A1 | 7/2005 | Park |
| 2005/0167928 A1 | 8/2005 | Park et al. |
| 2005/0171282 A1 | 8/2005 | Park |
| 2005/0222337 A1 | 10/2005 | Park |
| 2005/0272872 A1 | 12/2005 | Park |
| 2005/0275565 A1 | 12/2005 | Nachtigal et al. |
| 2005/0281973 A1 | 12/2005 | Park |
| 2005/0288434 A1 | 12/2005 | Sugiura et al. |
| 2006/0004126 A1 | 1/2006 | Park et al. |
| 2006/0142467 A1 | 6/2006 | Park |
| 2006/0142491 A1 | 6/2006 | Park |
| 2006/0142492 A1 | 6/2006 | Park |
| 2006/0148954 A1 | 7/2006 | Park et al. |
| 2006/0290070 A1 | 12/2006 | Park |
| 2007/0004862 A1 | 1/2007 | Park et al. |
| 2007/0004865 A1 | 1/2007 | Park |

FOREIGN PATENT DOCUMENTS

| | | |
|---|---|---|
| EP | 0304843 | 3/1993 |
| EP | 0566313 | 10/1993 |
| EP | 0681113 | 11/1995 |
| EP | 0714944 | 6/1996 |
| EP | 1209203 | 5/2002 |
| JP | 58-032655 | 2/1983 |
| JP | 62-011767 | 1/1987 |
| JP | 62-236841 | 10/1987 |
| JP | 05-186606 | 7/1993 |
| JP | 2000-079928 | 3/2000 |
| JP | 2001-336679 | 12/2001 |
| WO | WO 96/00761 | 1/1996 |
| WO | WO 00/11073 | 3/2000 |
| WO | WO 01/48077 | 7/2001 |
| WO | WO 01/98405 | 12/2001 |

OTHER PUBLICATIONS

"AFLAS™ The Fluoroelastomer", Asahi Glass Company, Product Information, pp. 1-8, Apr. 11, 2003.

"Fluorine-Containing Polymers", Encyclopedia of Polymer Science & Engineering, vol. 7, 1987, Second Edition, pp. 256-267.

"Viton® Fluoroelasotmer, A Product of DuPont Dow Elastomers", Technical Information, DuPont Dow Elastomers, Copyright 1988.

"Viton® Extreme™ ETP-600S (formerly designated VTR-8710)", Technical Information (made with Advanced Polymer Architecture), DuPont Dow Elastomers, Jun. 2004, pp. 1-6.

Moore, Michael J. "Silanes as Rubber-to-Metal Bonding Agents," 160th Meeting of the Rubber Division, American Chemical Society, Cleveland, Ohio, Paper No. 105, (2001). (17 pages).

Material Safety Data Sheet "DuPont™ TPV 60A01 and 80A01", C.S. Wong, (Sep. 18, 2001). (9 pages).

Solvay Solexis: "Product Data Sheet: Tecnoflon FPA 1" available at www.solvaysolexis.com. Copyright 2003. (2 pages).

\* cited by examiner

DYNAMIC VULCANIZATION OF ELASTOMERS WITH IN-SITU POLYMERIZATION

The present invention relates to thermoprocessable compositions containing cured elastomers. It also relates to methods for their production by dynamic vulcanization techniques.

Cured elastomeric materials have a desirable set of physical properties typical of the elastomeric state. They show a high tendency to return to their original sized and shape following removal of a deforming force, and they retain physical properties after repeated cycles of stretching, including strain levels up to 1000%. Based on these properties, the materials are generally useful for making shaped articles such as seals and gaskets.

Because they are thermoset materials, cured elastomeric materials can not generally be processed by conventional thermoplastic techniques such as injection molding, extrusion, or blow molding. Rather, articles must be fashioned from elastomeric materials by high temperature curing and compression molding. Although these and other rubber compounding operations are conventional and known, they nevertheless tend to be more expensive and require higher capital investment than the relatively simpler thermoplastic processing techniques. Another drawback is that scrap generated in the manufacturing process is difficult to recycle and reuse, which further adds to the cost of manufacturing such articles.

A process of dynamic vulcanization may be used to provide some compositions having a desirable combination of elastomeric and thermoplastic processability characteristics. In dynamic vulcanization, an elastomeric material is mixed together with a thermoplastic polymeric material in the molten state, under conditions where the elastomer is crosslinked or cured while mixing together with the thermoplastic. The resulting composition contains a discrete phase of a cured elastomer and a continuous phase of a thermoplastic matrix.

The structure of the composition formed during dynamic vulcanization depends in part on the relative viscosities of the elastomeric phase and the thermoplastic phase during mixing. Typically, the viscosity of the molten thermoplastic is considerably higher than that of the uncured elastomer. This leads to a dispersal of the less viscous elastomer material in a continuous phase made of the more viscous thermoplastic. As cure progresses, the viscosity of the elastomeric portion increases, but by the time it reaches a high viscosity, the dispersed nature of the structure is already set. The relative viscosity of the two phases affects their compatibility and the ability to incorporate additives or fillers into the two phases during dynamic vulcanization.

High temperatures are often required for dynamic vulcanization, because the thermoplastic must be molten during the process. This leads to higher expense, and can lead to difficulty if the system is not stable at the elevated temperature.

It would be desirable to provide an elastomeric or rubber composition that would combine elastomeric properties with the advantages of thermoplastic processability. It would further be desirable to provide methods for making such compositions that overcome some of the disadvantages associated with vulcanizing the elastomers in the presence of a high melting thermoplastic.

SUMMARY

The present invention provides processable rubber compositions comprising a vulcanized elastomeric material dispersed in a matrix of a thermoplastic polymeric material. The elastomeric material comprises a synthetic polymeric material that exhibits elastomeric properties when crosslinked or vulcanized. In one embodiment the matrix forms a continuous phase and the vulcanized elastomeric material is in the form of particles forming a non-continuous phase.

In one embodiment, the present invention provides methods for making rubber compositions comprising combining an elastomeric material as described above, a curing agent that will react with and cure the elastomer, and a reactive low molecular weight oligomer, and heating the combination at a temperature and for a time sufficient to effect vulcanization of the elastomeric material and simultaneous in-situ polymerization of the oligomer, while mechanical energy is applied to mix the mixture during the heating step. The oligomer polymerizes during the process to form a thermoplastic polymeric material that forms the continuous phase of the processable rubber composition.

Shaped articles may be readily formed from the rubber compositions according to conventional thermoplastic processes such as blow molding, injection molding, and extrusion. Non-limiting examples of useful articles include seals, gaskets, O-rings, and hoses. Further areas of applicability of the present invention will become apparent from the detailed description provided hereinafter.

DESCRIPTION

The following description of the preferred embodiment(s) is merely exemplary in nature and is in no way intended to limit the invention, its application, or uses. The following definitions and non-limiting guidelines must be considered in reviewing the description of this invention set forth herein.

The headings (such as "Introduction" and "Summary,") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

The terms "elastomeric material," "elastomer," and the like refer to chemical compositions that possess, or can be modified (i.e. cured or crosslinked) to possess elastomeric properties. According to context, the terms refer to an uncured or partially cured material, in which elastomeric properties are not fully developed, or to a cured rubber-like material, with fully developed elastomeric properties. At some points in the specification, the terms are used with adjectives such as "cured", "partially cured", or "uncured" for clarity.

The terms "curing agent," "curative," "curative agent," and the like are used interchangeably to designate the chemical compound or composition that reacts with the (uncured) elastomer to form a cured elastomer and to develop the elastomeric properties of the cured product. According to context it is used to refer to a formal curing initiator (e.g. a radical initiator such as a peroxide) as well as a crosslinking agent that may be used in conjunction with the initiator (e.g. triallylisocyanurate). At some points, the term "curing system" or the like is used to refer to a combination of initiator and crosslinker and optional additional components used in the curing. It is to be understood that often the curing system is provided by an elastomer supplier (and may be incorporated into the elastomer), and may be used according to the manufacturer's instructions.

In various embodiments, the present invention provides methods for making rubber compositions, said methods comprising:
 (a) forming a mixture by combining an uncured or partially cured elastomeric material, a curing agent that reacts with the elastomeric material, and a reactive oligomer comprising a compound that polymerizes to form a thermoplastic polymer matrix of the composition;
 (b) heating and applying mechanical energy to the mixture at a temperature and for a time sufficient to effect vulcanization of the elastomeric material and polymerization of the reactive oligomer;

In another aspect, the invention provides methods for making a processable rubber composition, comprising
 (a) forming a mixture of an uncured or partially cured elastomer material and a reactive oligomer; and
 (b) simultaneously curing the elastomeric material and polymerizing the oligomer in the mixture;
 (c) wherein the oligomer polymerizes to form a thermoplastic material by ring opening or condensation polymerization.

In another aspect, the invention provides a method for making a processable rubber composition, comprising:
 (a) forming a mixture of an uncured or partially cured elastomer material and a reactive oligomer; and
 (b) simultaneously curing the elastomeric material and polymerizing the oligomer in the mixture;

wherein the oligomer polymerizes to form a thermoplastic material by ring opening or condensation polymerization.

According to the invention, processable rubber compositions are provided that contain a vulcanized elastomeric material dispersed in a matrix. The vulcanized elastomeric material is the product of vulcanizing, crosslinking, or curing an elastomer. The matrix is made of a thermoplastic material. In one aspect, a thermoplastic material is one the melt viscosity of which can be measured, such as by ASTM D-1238 or D-2116, at a temperature above its melting point A thermoplastic material softens and flows upon heating.

The processable rubber compositions may be processed by conventional thermoplastic techniques to form shaped articles having physical properties that make them useful in a number of applications calling for elastomeric properties. In particular preferred embodiments, shaped articles made from the processable compositions typically exhibit a Shore A hardness of 50 or more, preferably Shore A 70 or more, typically in the range of Shore A 70 to Shore A 90. In addition or alternatively, the tensile strength of the shaped articles will preferably be 4 MPa or greater, preferably 8 MPa or greater, typically about 8-13 MPa. In still other embodiments, shaped articles may be characterized as having a modulus at 100% of at least 2 MPa, preferably at least about 4 MPa, and typically in the range of about 4-8 MPa. In other embodiments, elongation at break of articles made from the processable compositions of the invention will be 10% or greater, preferably at least about 50%, more preferably at least about 150%, and typically in the range of 150-300%. In various embodiments, shaped articles of the invention are characterized as having at least one of hardness, tensile strength, modulus, and elongation at break in the above noted ranges.

In one aspect, the rubber compositions are made of two-phases where the matrix forms a continuous phase, and the vulcanized elastomeric material is in the form of particles forming a non-continuous, disperse, or discrete phase. In another aspect, the elastomeric material and the matrix form co-continuous phases.

In preferred embodiments, the compositions contain 35% by weight or more, and preferably 40% by weight or more of the elastomer phase, based on the total weight of elastomer and thermoplastic material. In other embodiments, the compositions contain 50% by weight or more of the elastomer phase. The compositions are homogenous blends of two phases that are sufficiently compatible that the compositions may readily be formed into shaped articles having sufficient elastomer properties, such as tensile strength, modulus, elongation at break, and compression set to be industrially useful as seals, gaskets, O-rings, hoses, and the like.

The elastomer phase may be present in the form of particles in a continuous thermoplastic phase, as a 3-D network forming a co-continuous phase with the thermoplastic material, or as a mixture of both. The particles or 3-D network of the elastomer phase preferably have minimum dimensions of 10 µm or less, and more preferably 1 µm or less.

In various embodiments, the rubber composition of the invention are made by dynamic vulcanization of an elastomer in the presence of a low molecular weight reactive oligomer. In this embodiment, a method is provided for making the rubber composition, comprising combining an elastomeric material, a curative agent, and the oligomer to form a mixture. The mixture is heated at a temperature and for a time sufficient to effect vulcanization or cure of the elastomer at the same time that the oligomer polymerizes to form a thermoplastic polymeric material. Mechanical energy is applied to the mixture of elastomeric material, curative agent and thermoplastic material during the heating step. Thus the method of the invention provides for mixing the elastomer and oligomer components in the presence of a curative agent for the elastomer and optionally an initiator for the oligomer, and heating during the mixing to effect cure of the elastomeric component with in-situ polymerization of the oligomer. Alternatively, the elastomeric material and oligomer may be mixed for a time and at a shear rate sufficient to form a dispersion of the elastomeric material in a continuous or co-continuous thermoplastic phase. The mixing is carried out for a time shorter than that required to initiate or complete the polymerization of the oligomer. Thereafter, the curative agent may be added to the dispersion while continuing the mixing. Finally, the dispersion is heated while continuing to mix to produce the processable rubber composition of the invention.

The compositions of the invention are preferably readily processable by conventional plastic processing techniques. In one embodiment, shaped articles are provided comprising the cured elastomers dispersed in a thermoplastic matrix. Shaped articles of the invention include, without limitation, seals, O-rings, gaskets, and hoses.

In various embodiments, the elastomers that may be used according to the invention are selected from the group consisting of diene rubbers, fluorocarbon elastomers, acrylic elastomers, ethylene acrylic elastomers, silicone rubbers, polyurethane elastomers, ethylene propylene elastomers, and the like. Mixtures of elastomers may also be used. The curing agent or curing system is chosen as one suitable for reacting with and crosslinking the elastomeric material. Depending on the elastomer, suitable crosslinking or curing agents include sulfur, sulfur donors, peroxides, phenolic curative, diamines, bismaleimides, and the like. The low molecular weight reactive oligomers, also referred to herein simply as "oligomers" polymerize under the reaction conditions to form thermoplastic polymeric materials. In preferred embodiments, the polymerized oligomer forms a continuous thermoplastic phase of the processable rubber compositions of the invention.

In various embodiments of the invention, the elastomer undergoes a kind of dynamic vulcanization in the presence of polymerizing oligomers to provide compositions with desirable rubber-like properties, but that can be thermally processed by conventional thermoplastic methods such as extrusion, blow molding, and injection molding. The elastomers are generally synthetic, non-crystalline polymers that exhibit rubber-like properties when crosslinked, cured, or vulcanized. As such, the cured elastomers, as well as the compositions of the invention made by dynamic vulcanization of the elastomers, are observed to substantially recover their original shape after removal of a deforming force, and show reversible elasticity up to high strain levels.

Non-limiting examples of diene rubber include natural rubber (NR), styrene-butadiene rubber (SBR), butadiene rubber (BR), ethylene-propylene-diene monomer rubber (EPDM), isoprene rubber (IR), nitrile rubber (NBR), butyl rubber (IIR), and chlorobutyl rubber (CIIR). The diene rubbers are well known in the art, and are commercially available, along with suitable curing agents and systems, from a variety of sources.

In various embodiments, diene rubbers of the invention are cured with sulfur vulcanization agents. In an exemplary recipe, about 0.4-4 phr of sulfur are used together with about 0.5-2 phr of a sulfur accelerator to provide systems that can cure in a matter of minutes. Normally, cure is further enhanced by the action of metal salt such as a zinc carboxylate, which is conveniently provided from ZnO and a fatty acid such as stearic acid included in the rubber formulation. A wide variety of accelerators is known. Non-limiting examples include benzothiazoles, benzothiazolesulfenamides, dithiocarbamates, and amines such as diphenylguanidine and di-o-tolylguanidine (DOTG). Sulfur is provided in the form of elemental sulfur, a sulfur donor such as tetramethylthiuram disulfide (TMTD) or dithiodimorpholine (DTDM), or a combination of elemental sulfur and sulfur donor.

In other embodiments, phenolic curatives are used to crosslink a diene rubber. These crosslinking agents are based on phenol, usually substituted with —$CH_2X$, where X is a halogen. The curative contains proton and electron acceptors in a proper steric relationship to establish a crosslink. In still other embodiments, bismaleimides such as m-phenylenebismaleimide are used as crosslinkers. A free radical source such as an organic peroxide may be used to initiate crosslinking by the bismaleimides. At higher temperatures, a free radical source is not required.

In various embodiments, organic peroxides are used to crosslink or cure diene rubbers, as well as other elastomers discussed below. They are useful for isoprene rubbers and butadiene rubbers, but are not preferred for butyl rubber. Peroxide curing systems are discussed below with respect to fluoroelastomers.

Acrylic elastomers have the ASTM designation ACM for polymers of ethyl acrylate and other acrylates, and ANM for copolymers of ethyl or other acrylates with acrylonitrile. Acrylic elastomers are prepared by polymerizing so-called backbone monomers with optionally a minor amount of cure site monomer. The backbone monomers are selected from among ethyl acrylate and other acrylic monomers. Other preferred acrylic acrylate monomers to be co-polymerized together with ethyl acrylate to make acrylic elastomers include n-butyl acrylate, 2-methoxyethyl acrylate, and 2-ethoxyethyl acrylate.

The acrylic elastomers may contain from about 1 to about 5 mole % or weight % of cure site monomers to introduce reactive sites for subsequent crosslinking. The particular cure site monomer used in an acrylic elastomer is in general proprietary to the supplier of the elastomer. Among common cure site monomers are those that contain unsaturated carbon bonds and their side chain and those that contain a carbon chlorine bond in the side chain. Acrylic elastomers (ACM) are commercially available, such as from Zeon under the Nypol® and Hytemp® tradenames, and from Unimatec under the Noxtite® tradename.

Ethylene acrylic elastomers have the ASTM designation AEM. They are based on copolymers of ethylene and acrylate monomers, with a minor amount of cure site monomer, usually containing a carboxyl group in the side chain. Curing agents or crosslinking agents may then be used to cure or vulcanize the ethylene acrylic elastomer by reacting with the functional group in the cure site monomer. Although the precise nature of the crosslinking agent is proprietary to the supplier of the ethylene acrylic elastomers, two main classes of curing of vulcanization agents for use with such elastomers are the class of diamines and the class of peroxides. Diamines have the advantage that they cure slower but can be used at higher temperatures without scorch from too fast a cure. Mixtures of curing agents may be used, as is known to those of skill in the art, to obtain a desirable cure rate in light of the temperature conditions of the reaction. Ethylene acrylic elastomers are commercially available, for example from DuPont under the Vamac® tradename. For example, Vamac G is used to designate a line diamine cured elastomers, while Vamac D represents a line of peroxide cured elastomers.

Silicone rubbers are well known. They are based on polysiloxanes that can be generally be crosslinked by the action of a number of curing agents or curing systems to form cured elastomers. Suitable curing agents include silanes, peroxides, and platinum catalysts. Commercial sources of silicone rubbers and curing systems include Dow Corning and General Electric.

Polyurethane elastomers contain repeating units containing urethane and/or urea groups. In some embodiments, the uncured elastomers are provided as gums or resins that can be crosslinked by the action of peroxides or other crosslinking agents such as isocyanates. Suitable polyurethane elastomers and curing systems are commercially available from such suppliers as BASF and Unimatec.

Fluorocarbon elastomers are curable compositions based on fluorine-containing polymers. Various types of fluoroelastomers may be used. One classification of fluoroelastomers is given in ASTM-D 1418, "Standard practice for rubber and rubber latices-nomenclature". The designation FKM is given for fluoro-rubbers that utilize vinylidene fluoride as a co-monomer. Several varieties of FKM fluoroelastomers are commercially available. A first variety may be chemically described as a copolymer of hexafluoropropylene and vinylidene fluoride. These FKM elastomers tend to have an advantageous combination of overall properties. Some commercial embodiments are available with about 66% by weight fluorine. Another type of FKM elastomer may be chemically described as a terpolymer of tetrafluoroethylene, hexafluoropropylene, and vinylidene fluoride. Such elastomers tend to have high heat resistance and good resistance to aromatic solvents. They are commercially available with, for example 68-69.5% by weight fluorine. Another FKM elastomer is chemically described as a terpolymer of tetrafluoroethylene, a fluorinated vinyl ether, and vinylidene fluoride. Such elastomers tend to have improved low temperature performance. They are available with 62-68% by weight fluorine. A fourth type of FKM elastomer is described as a terpolymer of tetrafluoroethylene, propylene, and vinylidene fluoride. Such FKM elastomers tend to have improved base resistance. Some commercial embodiments contain about 67% weight fluorine. A fifth type of FKM elastomer may be described as a pentapolymer of tetrafluoroethylene, hexafluoropropylene, ethylene, a fluorinated vinyl ether and vinylidene fluoride. Such elastomers typically have improved base resistance and have improved low temperature performance.

Another category of fluorocarbon elastomers is designated as FFKM. These elastomers may be designated as perfluoroelastomers because the polymers are completely fluorinated and contain no carbon hydrogen bond. As a group, the FFKM fluoroelastomers tend to have superior fluid resistance. They were originally introduced by DuPont under the Kalrez® trade name. Additional suppliers include Daikin and Ausimont.

A third category of fluorocarbon elastomer is designated as FTPM. Typical of this category are the copolymers of propylene and tetrafluoroethylene. The category is characterized by a high resistance to basic materials such as amines.

Preferred fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr). The copolymers may also contain relatively minor amounts of cure site monomers (CSM), discussed further below. Preferred copolymer fluorocarbon elastomers include VDF/HFP, VDF/HFP/CSM, VDF/HFP/TFE, VDF/HFP/TFE/CSM, VDF/PFVE/TFE/CSM, TFE/Pr, TFE/Pr/VDF, TFE/Et/PFVE/VDF/CSM, TFE/Et/PFVE/CSM and TFE/PFVE/CSM. The elastomer designation gives the monomers from which the elastomer gums are synthesized. In various embodiments, the elastomer gums have viscosities that give a Mooney viscosity in the range generally of 15-160 (ML1+10, large rotor at 121° C.), which can be selected for a combination of flow and physical properties. Elastomer suppliers include Dyneon (3M), Asahi Glass Fluoropolymers, Solvay/Ausimont, Dupont, and Daikin.

In a preferred embodiment, the elastomeric material comprises repeating units derived from 10-90 mole % tetrafluoroethylene, 10-90 mole % $C_{2-4}$ olefin, and up to 30 mole % of one or more additional fluorine-containing monomers. Preferably, the repeating units are derived from 25-90 mole % tetrafluoroethylene and 10-75 mole % $C_{2-4}$ olefin. In another preferred embodiment, the repeating units are derived from 45-65 mole % tetrafluoroethylene and 20-55 mole % $C_{2-4}$ olefin.

In various embodiments, the molar ratio of tetrafluoroethylene units to $C_{2-4}$ olefin repeating units is from 60:40 to 40:60. In another embodiment, the elastomeric material comprises alternating units of $C_{2-4}$ olefins and tetrafluoroethylene. In such polymers the molar ratio of tetrafluoroethylene to $C_{2-4}$ olefin is approximately 50:50.

In another embodiment, the elastomeric materials are provided as block copolymers having an A-B-A structure, wherein A represents a block of poly-tetrafluoroethylene and B represents a block of polyolefin.

A preferred $C_{2-4}$ olefin is propylene. Elastomeric materials based on copolymers of tetrafluoroethylene and propylene are commercially available, for example from Asahi under the Aflas® trade name.

A preferred additional monomer in the vulcanized elastomeric material is vinylidene difluoride. Other fluorine-containing monomers that may be used in the elastomeric materials of the invention include without limitation, perfluoroalkyl vinyl compounds, perfluoroalkyl vinylidene compounds, and perfluoroalkoxy vinyl compounds. Hexafluoropropylene (HFP) is an example of perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from Dupont under the Viton® ETP trade name.

In another embodiment, the elastomeric materials are curable fluorocarbon elastomers containing repeating units derived from fluoromonomers vinylidene fluoride (VDF) and hexafluoropropylene (HFP). In some embodiments, the elastomers further contain repeating units derived from tetrafluoroethylene.

Chemically, in this embodiment the elastomeric material is made of copolymers of VDF and HFP, or of terpolymers of VDF, HFP, and tetrafluoroethylene (TFE), with optional cure site monomers. In preferred embodiments, they contain about 66 to about 70% by weight fluorine. The elastomers are commercially available, and are exemplified by the Viton® A, Viton® B, and Viton® F series of elastomers from DuPont Dow Elastomers. Grades are commercially available containing the gum polymers alone, or as curative-containing pre-compounds.

In another embodiment, the elastomers can be described chemically as copolymers of TFE and PFVE, optionally as a terpolymer with VDF. The elastomer may further contain repeating units derived from cure site monomers.

Fluorocarbon elastomeric materials used to make the processable rubber compositions of the invention may typically be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed may be controlled by the relative amounts of initiators used compared to the monomer level and the choice of transfer agent if any. Typical transfer agents include carbon tetrachloride, methanol, and acetone. The emulsion polymerization may be conducted under batch or continuous conditions. Such fluoroelastomers are commercially available as noted above.

In various embodiments, the fluoroelastomers of the composition of the invention also comprise at least one halogenated cure site or a reactive double bond resulting from the presence of a copolymerized unit of a non-conjugated diene. In various embodiments, the fluorocarbon elastomers contain up to 5 mole % and preferably up to 3 mole % of repeating units derived from the so-called cure site monomers.

The cure site monomers are preferably selected from the group consisting of brominated, chlorinated, and iodinated olefins; brominated, chlorinated, and iodinated unsaturated ethers; and non-conjugated dienes. Halogenated cure sites may be copolymerized cure site monomers or halogen atoms that are present at terminal positions of the fluoroelastomer polymer chain. The cure site monomers, reactive double bonds or halogenated end groups are capable of reacting to form crosslinks.

The brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2Br—R_f—O—CF=CF_2$ ($R_f$ is perfluoroalkylene), such as $CF_2BrCF_2$ $O—CF=CF_2$, and fluorovinyl ethers of the class $ROCF=CFBr$ or $ROCBr=CF_2$, where R is a lower alkyl group or fluoroalkyl group, such as $CH_3OCF=CFBr$ or $CF_3CH_2OCF=CFBr$.

Iodinated olefins may also be used as cure site monomers. Suitable iodinated monomers include iodinated olefins of the formula: $CHR=CH-Z-CH_2CHR—I$, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1; 3-chloro-4-iodo-3,4,4-trifluorobutene; 2-iodo-1,1,2,2-tetrafluoro-1-(vinyloxy) ethane; 2-iodo-1-(perfluorovinyloxy)-1,1,2,2-tetrafluoroethylene; 1,1,2,3,33-hexafluoro-2-iodo-1-(perfluorovinyloxy) propane; 2-iodoethyl vinyl ether; 3,3,4,5,5,5-hexafluoro-4-iodopentene; and iodotrifluoroethylene are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1; 4-iodo-3,3,4,4-tetrafluorobutene-1; and bromotrifluoroethylene.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoper-fluorohexane; 1,3-diiodo-2-chloroperfluoropropane; 1,2-di(iododifluoromethyl)perfluoro-cyclobutane; monoiodoperfluoroethane; monoiodoperfluorobutane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)perfluorocyclobutane; monoiodoperfluoroethane; monoiodoperfluoro-butane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other cure monomers may be used that introduce low levels, preferably less than or equal about 5 mole %, more preferably less than or equal about 3 mole %, of functional groups such as epoxy, carboxylic acid, carboxylic acid halide, carboxylic ester, carboxylate salts, sulfonic acid groups, sulfonic acid alkyl esters, and sulfonic acid salts. such monomers and cure are described for example in Kamiya et al., U.S. Pat. No. 5,354,811.

Useful curative agents for fluorocarbon elastomers include diamines, peroxides, and polyol/onium salt combinations. Diamine curatives are relatively slow curing, but offer advantages in several areas. Such curatives are commercially available, for example as Diak-1 from DuPont Dow Elastomers.

Preferred peroxide curative agents are organic peroxides, for example dialkyl peroxides or diacyl peroxides. Preferably, the organic peroxide is selected to function as a curing agent for the composition in the presence of the other ingredients and under the temperatures to be used in the curing operation without causing any harmful amount of curing during mixing or other operations which are to precede the curing operation. A dialkyl peroxide that decomposes at a temperature above 49° C. is especially preferred when the composition is to be subjected to processing at elevated temperatures before it is cured. In some embodiments it is preferred to use a di-tertiarybutyl peroxide having a tertiary carbon atom attached to a peroxy oxygen. Non-limiting examples include 2,5-dimethyl-2,5-di(tert-butylperoxy)-3-hexyne; 2,5-dimethyl-2,5-di(tert-butylperoxy)hexane; and 1,3-bis-(t-butylperoxyisopropyl)benzene. Other non-limiting examples of peroxide curative agent include dicumyl peroxide, dibenzoyl peroxide, tertiary butyl perbenzoate, di[1,3-dimethyl-3-(t-butylperoxy)butyl]carbonate, and the like.

Suitable onium salts are described, for example, in U.S. Pat. Nos. 4,233,421; 4,912,171; and 5,262,490, each of which is incorporated herein by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

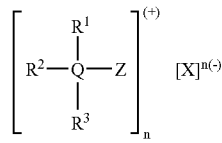

where

Q is nitrogen or phosphorus;

Z is a hydrogen atom or
  is a substituted or unsubstituted, cyclic or acyclic alkyl group having from 4 to about 20 carbon atoms that is terminated with a group of the formula —COOA where A is a hydrogen atom or a $NH_4^+$ cation or Z is a group of the formula
—$CY_2COOR'$ where Y is a hydrogen or halogen atom, or is a substituted or unsubstituted alkyl or aryl group having from 1 to about 6 carbon atoms that may optionally contain one or more quaternary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;

$R_1$, $R_2$, and $R_3$ are each, independently, a hydrogen atom or an alkyl, aryl, alkenyl, or any combination thereof, each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the formula Z where Z is as defined above;

X is an organic or inorganic anion (for example, without limitation, halide, sulfate, acetate, phosphate, phosphonate, hydroxide, alkoxide, phenoxide, or bisphenoxide); and n is a number equal to the valence of the anion X.

The polyol crosslinking agents may be any of those polyhydroxy compounds known in the art to function as a crosslinking agent or co-curative for fluoroelastomers, such as those polyhydroxy compounds disclosed in U.S. Pat. No. 4,259,463 (Moggi et al.), U.S. Pat. No. 3,876,654 (Pattison), U.S. Pat. No. 4,233,421 (Worm), and U.S. Defensive Publication T107,801 (Nersasian). Preferred polyols include aromatic polyhydroxy compounds, aliphatic polyhydroxy compounds, and phenol resins.

Representative aromatic polyhydroxy compounds include any one of the following: di-, tri-, and tetrahydroxybenzenes, -naphthalenes, and -anthracenes, and bisphenols of the Formula

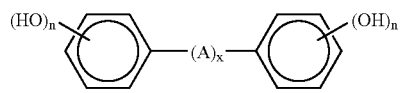

wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. It will be understood from the above bisphenol formula III that the —OH groups can be attached in any position (other than number one) in either ring. Blends of two or more such compounds can also be used. A preferred bisphenol compound is Bisphenol AF, which is 2,2-bis(4-hydroxyphenyl)hexafluoropropane. Other non-limiting examples include 4,4'-dihydroxydiphenyl sulfone (Bisphenol S) and 2,2-bis(4-hydroxyphenyl)propane (Bisphenol A). Aromatic polyhydroxy compound, such as hydroquinone may also be used as curative agents. Further non-limiting examples include catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Aliphatic polyhydroxy compounds may also be used as a polyol curative. Examples include fluoroaliphatic diols, e.g. 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

Phenol resins capable of crosslinking a rubber polymer can be employed as the polyol curative agent. Reference to phenol resin may include mixtures of these resins. U.S. Pat. Nos. 2,972,600 and 3,287,440 are incorporated herein in this regard. These phenolic resins can be used to obtain the desired level of cure without the use of other curatives or curing agents.

Phenol resin curatives can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. Useful commercially available phenol resins include alkylphenol-formaldehyde resin, and bromomethylated alkylphenol-formaldehyde resins.

In one embodiment, phenol resin curative agents may be represented by the general formula

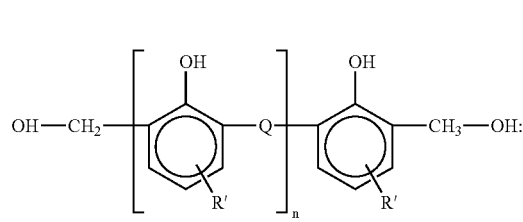

where Q is a divalent radical selected from the group consisting of —CH$_2$— and —CH$_2$—O—CH$_2$—; m is zero or a positive integer from 1 to 20 and R' is hydrogen or an organic radical. Preferably, Q is the divalent radical —CH$_2$—O—CH$_2$—, m is zero or a positive integer from 1 to 10, and R' is hydrogen or an organic radical having less than 20 carbon atoms. In another embodiment, preferably m is zero or a positive integer from 1 to 5 and R' is an organic radical having between 4 and 12 carbon atoms. Other preferred phenol resins are also defined in U.S. Pat. No. 5,952,425, which is incorporated herein by reference.

Reactive oligomers are low molecular weight molecules or mixtures of molecules that can polymerize to form a thermoplastic polymeric material. In various embodiments, they polymerize by condensation polymerization or by ring opening polymerization. In a preferred embodiment, the reactive oligomer is not covalently incorporated into the elastomer molecule during the processes described here.

Depending on their nature and their method of production, the reactive oligomers may be single, preferably substantially pure, compounds, or they may be mixtures of compounds. They contain at least two reactive groups, and can be disposed as cyclic or as linear oligomers. When they are cyclic oligomers, the two reactive groups can be in the form of a single organic group. For example, the two reactive groups may be a carboxylic acid group and a hydroxyl group. In a cyclic form, the two reactive groups are combined in the form of an ester. In another example, the two reactive groups of carboxyl and amino are combined in a cyclic oligomer into an amide or lactam. In various embodiments, the oligomers may contain in their structure a single repeating unit of the polymer they form, or may contain several repeating units but less than the number associated with a fully polymerized thermoplastic. Because of their low molecular weight, they have a viscosity that is less than that of a thermoplastic material used in conventional dynamic vulcanization. They are further distinguished by the fact that they are capable of reacting to form a polymer at the same time and under the same conditions that cure of the elastomeric component is taking place. The reaction to form a thermoplastic polymer is marked by an increase in viscosity during the course of the reaction, with a concomitant increase in molecular weight.

In one aspect, the oligomer comprises a monomeric material or mix of monomeric components that form a polymeric thermoplastic material under the conditions of the reaction. In a non-limiting example, the oligomer can comprise a lactone or a lactam monomeric component that is capable of polymerizing to form a thermoplastic polyester or polyamide, respectively. Such components are monomeric in the sense that they react with other monomeric or oligomeric components to form a polymer into which the structure of the monomeric component is incorporated.

Suitable oligomers include oligomers that react to form polyester thermoplastic material. Such include cyclic butylene terephthalate, which forms polybutylene terephthalate upon polymerization. Another example is poly cyclohexylene dimethylene terephthalate oligomer. Another class of oligomer that can react to form a polyester is cyclic esters, including cyclic di- or higher esters of diols with dicarboxylic acids or carbonic acid. Similar to the cyclic esters are the lactones, defined as internal mono-, di-, or higher esters of hydroxycarboxylic acids. Non-limiting examples include ε-caprolactone, tridecanolactone, and pentadecanolactone. Polymerization of cyclic esters and lactones may be initiated by Lewis or Bronsted acids, by H-donors such as carboxylic acids, alcohols, glycols, and alkanolamines, by amines and phosphines, by hydrides and alkoxides, by alkyl derivatives of alkali and alkaline earth metals, by tin (II) and tin (IV) compounds, and by titanates.

Other suitable oligomers polymerize to form thermoplastic polyamides. Non-limiting examples include cyclic amides, lactams, and lactam oligomers. These monomeric and oligomeric components polymerize to form polyamides under the process conditions of the invention. For example, caprolactam and/or caprolactam oligomers polymerize during cure of the co-mixing elastomer to form polymeric nylon 6.

In various embodiments, the oligomers are prepared by the depolymerization of higher molecular weight thermoplastic polymers. As a non-limiting example, suitable polyester-forming oligomers may be prepared by contacting a polyester polymer with a depolymerization catalyst in an organic solvent, as described, for example in U.S. Pat. Nos. 5,407,984 and 5,668,186 to Brunelle et al. Suitable depolymerization catalysts include tin compounds and titanium compounds. Polyamides may be depolymerized, for example by reaction with steam, to provide oligomers that can be polymerized to form polyamides under the process conditions of the invention. For example, polycaprolactam can be depolymerized to yield a mixture of caprolactam and caprolactam oligomers suitable for use as the reactive oligomer of the invention.

In a preferred embodiment, the oligomers are in the form of a macrocyclic polyester oligomer. Many different macrocyclic polyester oligomers can readily be made and are useful in the practice of this invention.

Macrocyclic polyester oligomers that may be employed in this invention include, but are not limited to, macrocyclic poly(alkylene dicarboxylate) oligomers having a structural repeat unit of the formula:

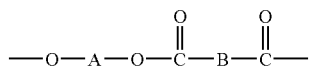

where A has 2-10 carbon atoms and is an alkylene, or a cycloalkylene or a mono- or polyoxyalkylene group; and B is a divalent aromatic or alicyclic group.

Non-limiting examples of macrocyclic polyester oligomers include macrocyclic poly(1,4-butylene terephthalate) (PBT), poly(1,3-propylene terephthalate) (PPT), poly(1,4-cyclohexylenedimethylene terephthalate) (PCT), poly(ethylene terephthalate) (PET), and poly(1,2-ethylene 2,6-naphthalenedicarboxylate) (PEN) oligomers, and copolyester oligomers comprising two or more of the above monomer repeat units.

Macrocyclic polyester oligomers may be prepared by known methods. Synthesis of the preferred macrocyclic polyester oligomers may include the step of contacting at least one diol of the formula HO-A-OH with at least one diacid chloride of the formula:

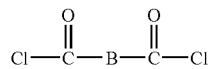

where A and B are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is between about −25° C. and about 25° C. See, e.g., U.S. Pat. No. 5,039,783 to Brunelle et al.

Macrocyclic polyester oligomers have also been prepared via the condensation of a diacid chloride with at least one bis(hydroxyalkyl)ester such as bis(4-hydroxybutyl)terephthalate in the presence of a highly unhindered amine or a mixture thereof with at least one other tertiary amine such as triethylamine, in a substantially inert organic solvent such as methylene chloride, chlorobenzene, or a mixture thereof. See, e.g., U.S. Pat. No. 5,231,161 to Brunelle et al.

Another method for preparing macrocyclic polyester oligomers or macrocyclic copolyester oligomers is to depolymerize linear polyester polymers in the presence of an organotin or titanate compound. In this method, linear polyesters are converted to macrocyclic polyester oligomers by heating a mixture of linear polyesters, an organic solvent, and a transesterification catalyst such as a tin or titanium compound. The solvents used, such as o-xylene and o-dichlorobenzene, usually are substantially free of oxygen and water. See, e.g., U.S. Pat. No. 5,407,984 to Brunelle et al. and U.S. Pat. No. 5,668,186 to Brunelle et al.

It is also within the scope of the invention to employ macrocyclic homo- and co-polyester oligomers to produce homo- and co-polyester polymers, respectively. Therefore, unless otherwise stated, an embodiment of a composition, article, or process that refers to a macrocyclic polyester oligomer also includes co-polyester embodiments.

Suitable reactive oligomers are commercially available, for example from Cyclics Corporation under the CBT® tradename. The CBT product is believed to be a cyclic oligomer prepared by the depolymerization of polybutylene terephthalate.

The oligomer preferably further comprises a polymerization catalyst that accelerates the polymerization of the oligomer to form higher molecular weight thermoplastic polymers. For example, the oligomers that polymerize to form polyesters preferably contain a tin or titanium catalyst, such as for example described in U.S. Pat. Nos. 6,420,047 and 6,369,157 to Winckler et al. Oligomers are commercially available from Cyclics Corporation that contain a polymerization catalyst.

In a preferred embodiment, plasticizers, extender oils, synthetic processing oils, or a combination thereof may be used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear α-olefins. The extender oils may also include organic esters, alkyl ethers, or combinations thereof. As disclosed in U.S. Pat. No. 5,397,832, it has been found that the addition of certain low to medium molecular weight organic esters and alkyl ether esters to the compositions of the invention lowers the Tg of the thermoplastic and rubber components, and of the overall composition, and improves the low temperatures properties, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

In addition to the elastomeric material, the thermoplastic polymeric material, and curative, the processable rubber compositions of this invention may include other additives such as stabilizers processing aids, curing accelerators, fillers, pigments, adhesives, tackifiers, and waxes. The properties of the compositions and articles of the invention may be modified, either before or after vulcanization, by the addition of ingredients that are conventional in the compounding of rubber, thermoplastics, and blends thereof.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of $C_{10}$-$C_{28}$ alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers. Preferred acid acceptor compounds include oxides and hydroxides of divalent metals. Non-limiting examples include $Ca(OH)_2$, MgO, CaO, and ZnO.

Non-limiting examples of fillers include both organic and inorganic fillers such as barium sulfate, zinc sulfide, carbon black, silica, titanium dioxide, clay, talc, fiber glass, glass beads, hollow glass spheres, fumed silica, mineral fibers, wood cellulose fibers, carbon fiber, boron fiber, polyimide powder, aramid fiber (Kevlar), steel powder, bronze powder, and molybdenum sulfide. Some non-limiting examples of processing additives include stearic acid and lauric acid. The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and an extender oil can improve processability, the resistance to oil swell, heat stability, hysteresis, cost, and permanent set. In a preferred embodiment, fillers such as carboxy block may make up to about 40% by weight of the total weight of the compositions of the invention. Preferably, the compositions comprise 1-40 weight % of filler. In other embodiments, the filler makes up 10 to 25 weight % of the compositions.

In various embodiments, fillers are incorporated into the dynamically vulcanizing blend prior to complete polymerization of the oligomer. The low viscosity of the molten oligomer prior to polymerization leads to an improved incorporation of filler into the thermoplastic phase. In some embodiments, the polymerization reaction leads to better compatibility of the thermoplastic and rubber phases with the filler.

In various embodiments, filler incorporation may also be enhanced by the use of low viscosity or liquid elastomers. Non-limiting examples of liquid elastomers include Unimatec LV 2000, a peroxide curable fluorocarbon elastomer; Dai-el G101, a low molecular weight fluorocarbon elastomer from Daikin; and Viton LM, a fluoroelastomer from Dupont. Another suitable liquid elastomer is an elastomer with a perfluoropolyether backbone and having terminal silicone crosslinking groups. Such an elastomer is commercially available as the Sifel® products of Shin-Etsu Chemical Co., Ltd. Liquid elastomers may be used as the sole elastomer, or may be combined with other higher viscosity elastomers to provide a kind of viscosity modification.

The vulcanized or cured elastomeric material, also referred to herein generically as a "rubber", is generally present as small particles within a continuous thermoplastic polymer matrix. A co-continuous morphology is also possible depending on the amount of elastomeric material relative to thermoplastic material, the cure system, and the mechanism and degree of cure of the elastomer and the amount and degree of mixing. Preferably, the elastomeric material is fully crosslinked/cured.

Full crosslinking can be achieved by adding an appropriate curative or curative system to a blend of oligomer and elastomeric material, and vulcanizing or curing the rubber to the desired degree under vulcanizing conditions. Dynamic vulcanization is effected by applying mechanical energy to mix the elastomeric and oligomer components at elevated temperature in the presence of the curative in conventional mixing equipment such as roll mills, Moriyama mixers, Banbury mixers, Brabender mixers, continuous mixers, mixing extruders such as single and twin-screw extruders, and the like. An advantageous characteristic of the compositions is that, notwithstanding the fact that the elastomeric component is fully cured, the compositions can be processed and reprocessed by conventional plastic processing techniques such as extrusion, injection molding and compression molding. Scrap or flashing can be salvaged and reprocessed.

Heating and mixing or mastication at vulcanization temperatures are generally adequate to complete the vulcanization reaction in a few minutes or less, but if shorter vulcanization times are desired, higher temperatures and/or higher shear may be used. Polymerization of the oligomer is usually complete in quite a short time as well, but depending on the temperature and the nature of the oligomer and polymerization catalyst, the polymerization reaction may take from one minute or less up to 10 or even 100 minutes. A suitable range of vulcanization temperature is from about the melting temperature of the oligomer material to about 300° C. or more. It is preferred to cure in the range of about 150° C. to about 190° C. It is preferred that mixing continue without interruption until vulcanization occurs or is complete.

In preferred embodiments, the processable rubber compositions prepared by the methods of the invention contain a cured rubber in the form of small dispersed particles essentially of an average particle size smaller than about 50 µm, preferably of an average particle size smaller than about 25 µm, and dispersed in a thermoplastic matrix, wherein the thermoplastic matrix is formed from the polymerization of the reactive oligomer. More typically and preferably, the particles have an average size of about 10 µm or less, preferably about 5 µm or less, and more preferably about 1 µm or less. In other embodiments, even when the average particle size is larger, there will be a significant number of cured elastomer particles less than 1 µm in size dispersed in the thermoplastic matrix.

The size of the particles referred to above may be equated to the diameter of spherical particles, or to the diameter of a sphere of equivalent volume. It is to be understood that not all particles will be spherical. Some particles will be fairly isotropic so that a size approximating a sphere diameter may be readily determined. Other particles may be anisotropic in that one or two dimensions may be longer than another dimension. In such cases, the preferred particle sizes referred to above correspond to the shortest of the dimensions of the particles.

In some embodiments, the cured elastomeric material is in the form of particles forming a dispersed, discrete, or non-continuous phase wherein the particles are separated from one another by the continuous phase made up of the thermoplastic matrix. Such structures are expected to be more favored at relatively lower loadings of cured elastomer, i.e. where the thermoplastic material takes up a relatively higher volume of the compositions. In other embodiments, the cured material may be in the form of a co-continuous phase with the thermoplastic material. Such structures are believed to be favored at relatively higher volume of the cured elastomer. At intermediate elastomer loadings, the structure of the two-phase compositions may take on an intermediate state in that some of the cured elastomer may be in the form of discrete particles and some may be in the form of a co-continuous phase.

The homogenous nature of the compositions, the small particle size indicative of a large surface area of contact between the phases, and the ability of the compositions to be formed into shaped articles having sufficient hardness, tensile strength, modulus, elongation at break, or compression set to be useful in industrial applications, indicate a relatively high degree of compatibility between the elastomer and thermoplastic phases. It is believed such compatibility results from the dynamic vulcanization process. During the process, the elastomeric particles are being crosslinked or cured while the oligomers are being polymerized and the two phases are being actively mixed and combined. The polymerization of the oligomer also is believed to lead to interactions that increase the compatibility of the thermoplastic and elastomeric phases. The process leads to a finer dispersion of the discrete or co-continuous elastomer phase in the thermoplastic than is possible with simple filling or mixing of a cured elastomer and a thermoplastic material.

The progress of the vulcanization and the polymerization of the oligomer may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. The stabilizer package is preferably added to the thermoplastic vulcanizate after vulcanization has been essentially completed, i.e., the curative has been essentially consumed.

The processable rubber compositions of the invention may be manufactured in a batch process or a continuous process. In a batch process, predetermined charges of elastomeric material, oligomer, and curing agents are added to a mixing apparatus. In a typical batch procedure, the elastomeric material and oligomer are first mixed, blended, masticated or otherwise physically combined until a desired particle size of elastomeric material is provided in a continuous phase of oligomer. When the structure of the elastomeric material is as desired, a curative agent may be added while continuing to apply mechanical energy to mix the elastomeric material and oligomer. Curing is effected by heating or continuing to heat the mixing combination of oligomer and elastomeric material in the presence of the curing agent and optional polymerization catalyst. When cure and polymerization is complete, the processable rubber composition may be removed from the reaction vessel (mixing chamber) for further processing.

The elastomeric material and oligomer may be mixed and dispersed at a fairly low temperature, because the components are relatively low in viscosity. If such a temperature is below that at which the curing agent is activated, the curing agent may be a part of the mixture during the initial particle dispersion step of the batch process. In some embodiments, a curative is combined with the elastomeric and oligomer material at a temperature below the curing temperature. When the desired dispersion is achieved, the temperature may be increased to effect cure. In various embodiments, commercially available elastomeric materials are used that contain a curative pre-formulated into the elastomer. However, if the curative agent is activated at the temperature of initial mixing, it is preferred to leave out the curative until the desired particle size distribution of the elastomeric material in the oligomer is achieved. In another embodiment, curative is added after the elastomeric and oligomer are mixed. In a preferred embodiment, the curative agent is added to a mixture of elastomeric particles in oligomer while the entire mixture continues to be mechanically stirred, agitated or otherwise mixed.

The polymerization kinetics of the oligomer will also have a bearing on the method. For example, if the polymerization is relatively slower than the curing reaction at a particular temperature, the polymerization reaction may be given a "head start", such as by heating the oligomer for a short period of time before beginning the cure of the elastomer. One way of accomplishing this is to initially stir the oligomer and optional polymerization catalyst for an initial period. After the initial period, the elastomeric material and curing agent may be added. Alternatively, the elastomeric material may be stirred or otherwise mixed with the polymerizing oligomer; when the desired time has passed, the curing agent may then be added to begin the cure of the elastomeric material. In some embodiments, it is preferred to mix the elastomeric material into the polymerizing oligomer. Such will generally lead to a uniform dispersion of the elastomeric material in the oligomer/thermoplastic phase. If fillers such as those described above are added during this stage (i.e. before cure and/or polymerization have been completed), there will in general be an enhanced incorporation of the filler into the two phases. Considerations such as described in this paragraph can be taken into account in practicing the various batch and continuous processes for producing the processable rubber compositions of the invention.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In a typical continuous procedure, thermoplastic material and oligomer are combined by inserting them into the screw extruder together from a first hopper using a feeder (loss-in-weight or volumetric feeder). Liquid elastomers and liquid oligomers may be injected with a liquid injection port of the extruder. Temperature and screw parameters may be adjusted to provide a proper temperature and shear to effect the desired mixing and particle size distribution of an uncured elastomeric component in the oligomer. The duration of mixing may be controlled by providing a longer or shorter length of extrusion apparatus or by controlling the speed of screw rotation for the mixture of elastomeric material and polymerizing oligomer to pass through during the mixing phase. The degree of mixing may also be controlled by the mixing screw element configuration in the screw shaft, such as intensive, medium or mild screw designs. Then, at a downstream port, by using side feeder (loss-in-weight or volumetric feeder), the curative agent and optional polymerization initiator may be added continuously to the mixture of thermoplastic material and oligomer as it continues to travel down the twin screw extrusion pathway. Alternatively, and without limitation, the curing agent may be added with the elastomer at the first port. Downstream of the curative additive port, the mixing parameters and transit time may be varied as described above. By adjusting the shear rate, temperature, duration of mixing, mixing screw element configuration, as well as the time of adding the curative agent and polymerization initiator, processable rubber compositions of the invention may be made in a continuous process. As in the batch process, the elastomeric material may be commercially pre-formulated to contain a curative agent.

As further illustration, a batch process may be carried out in the following way. In a batch procedure, various elastomers (e.g. fluorocarbon elastomers, AEM, ACM, NBR, HNBR, silicone, EPDM, polyurethanes, and the like) and reactive oligomers are compounded by using batch mixtures such as Banbury mixers, Moriyama mixers, or Brabender mixers with a batch mixer attachment. The elastomeric material is first softened to reduce the viscosity in the batch mixer at an elevated temperature. Typically, the temperature of softening ranges from about room temperature to above 300° C., depending on the curing chemistry of the elastomer and the polymerization kinetics of the elastomer oligomer. If the elastomeric material is a liquid, it may be poured into the batch mixer and heated to an elevated temperature. Next, the reactive oligomer may be added. Preferably, the temperature of the elastomer added in the previous step is at or above a temperature at which the reactive oligomer melts. The elastomeric material and reactive oligomer may be mixed for a time to obtain a homogeneous mixture. The elastomeric material and reactive oligomer may be mixed for a further time to accomplish a partial or complete polymerization of the reactive oligomer, depending on the cure kinetics of the elastomeric material and the desired properties of the dynamic vulcanizate. The polymerization speed of various oligomers depends on temperature. For example, a cyclic oligomer such as CBT from Cyclics Corporation requires about 100 minutes for polymerization at 170° C., but only about one minute for complete polymerization at 250° C.

The temperature of melting, mixing, curing, and polymerizing is also affected by the chemistry of the elastomeric curing system. For example, peroxide curable elastomers such as fluorocarbon elastomers are preferably cured at relatively lower temperatures between about 60° C. and 230° C., preferably 80° C.-190° C., due to the volatility of the peroxide curing agent. On the other hand, less volatile curing agents such as bisphenol curing agents may be used at higher temperatures between 100° C. and 300° C., preferably 150° C.-250° C., to accelerate the curing reaction of the elastomers.

After an initial mixing time, a curative package for the elastomeric material may be added, along with fillers, processing aids, and other additives. Mixing is continued until a homogeneously mixed combination of cured elastomer and polymerized reactive oligomer is formed. The course of the cure reaction and polymerization of the oligomer may be followed by measuring the viscosity of the material mixing in the batch mixer. Typical cure times are from about 10 to about 15 minutes at relatively high temperatures up to 250° C. for bisphenol curable fluorocarbon elastomers, and about 50 to 60 minutes for peroxide curable elastomers at lower temperatures, typically around 150° C. to 170° C.

Alternatively, elastomeric materials may be used that contain the curing agent or curing system incorporated into the elastomer. In these embodiments, the elastomeric material will generally begin to cure as soon as an elevated temperature is reached. Depending on the kinetics of the elastomeric curing system and the polymerization rate of the reactive oligomer, the cure incorporated elastomer and oligomer may be added to the mixer at the same time, or one or other of the elastomeric material and reactive oligomer may be added to the mixer to provide a "head start". In this way, suitable reaction conditions, orders of addition, and reaction times may be selected to prepare dynamic vulcanizates from a variety of elastomeric materials and reactive oligomers, optionally containing a variety of fillers.

In various embodiments, continuous processes for making the processable rubber compositions of the invention are carried out in continuous mixers such as twin screw extruders. Solid elastomers may be ground to the size of plastic pellets or powder (typically about 1 to 2 mm in size for pellets). The ground elastomers and reactive oligomer pellets or powder are mixed together and poured into a hopper of the twin screw extruder. The temperature of the screw barrel and the dye on the twin screw extruder is set between about 170° C. and 250° C. depending on the elastomer curing chemistry and the polymerization speed of the reactive oligomer, as discussed above in the case of the batch process. The elastomer and oligomer are set into the heated barrel to begin the reaction. For convenience, peroxide curable elastomer/oligomer formulations may be set at the low end of the preferred temperature (e.g. about 170° C. to about 190° C.) and bisphenol curable elastomer oligomer formulations may be set at the higher end of the desired temperature range (e.g. about 230° C. to about 250° C.). In various embodiments, the elastomeric material and the reactive oligomer are melted in the melt zone of the barrel, compressed in the compression zone, and mixed in the mixing zone when the twin screws are rotated to push the molten mixture through the front side of the extruder barrel. Liquid elastomeric materials and/or liquid oligomers may be added to the twin screw barrel by means of liquid injection poured instead of the hopper feeder discussed above.

A curative package (for the elastomer), fillers, processing aids, and other additives may be added through a side feeder at a downstream feeding section. In this embodiment, the polymerization of the reactive oligomer proceeds in the presence of the uncured elastomer for a time before the filler, curing agent, and other additives are added. In an alternative embodiment, the elastomeric material is pre-incorporated with a curing system, in which case curing of the elastomer proceeds at the same time the polymerization of the reactive oligomer occurs in the heated barrel.

After a combination of elastomeric material, curing agent that reacts with the elastomeric material to form a cured elastomer or rubber, and reactive oligomer is formed, the combination is further mixed until a homogeneous mixture is obtained that contains fully cured elastomer and fully polymerized oligomer forming a thermoplastic polymeric material. The residence time in the twin screw extruder barrel after addition of the curing agent and other additives or after a combination of a reactive oligomer with a cure incorporated elastomer may be varied according to the kinetics of the elastomeric cure and the oligomer polymerization. The residence time in the barrel may be varied by changing the screw speed of the extruder. For example, a slow screw speed, such as about 20 to 30 RPM, may be set for peroxide curable elastomer compositions and a high screw speed such as 150 to 250 RPM may be set for bisphenol curable elastomeric materials. The slower speeds lead to longer residence times, which are suitable for the slower curing peroxide systems that cure at a slower rate due to the use of lower temperature, as described above with respect to the batch process, or for oligomers requiring longer polymerization times. On the other hand, the higher screw speeds used with such curing agents as bisphenols lead to a shorter residence period, which is acceptable for curing systems that can run at higher temperatures, such as the bisphenols, and for oligomers requiring a shorter polymerization time. Typical residence time is about 50 to 60 minutes at the slow screw speed and about 10 to 15 minutes at the high screw speeds. The residence time at low and high screw speeds also depends on the length of the barrel.

The fully cured and polymerized elastomer/thermoplastic polymer mixture is then extruded through a strand dye at the end of the twin screw extruder barrel and is cooled and pelletized for use in subsequent fabrication processes.

The compositions and articles of the invention will contain a sufficient amount of vulcanized elastomeric material ("rubber") to form a rubbery composition of matter, that is, they will exhibit a desirable combination of flexibility, softness, and compression set. Preferably, the compositions should comprise at least about 25 parts by weight rubber, preferably at least about 35 parts by weight rubber, more preferably at least about 40 parts by weight rubber, even more preferably at least about 45 parts by weight rubber, and still more preferably at least about 50 parts by weight rubber per 100 parts by weight of the rubber and thermoplastic polymer combined. The amount of cured rubber within the thermoplastic vulcanizate is generally from about 5 to about 95 percent by weight, preferably from about 35 to about 95 percent by weight, more preferably from about 40 to about 90 weight percent, and more preferably from about 50 to about 80 percent by weight of the total weight of the rubber and the thermoplastic polymer combined.

The amount of thermoplastic polymer within the processable rubber compositions of the invention is generally from about 5 to about 95 percent by weight, preferably from about 10 to about 65 percent by weight and more preferably from about 20 to about 50 percent by weight of the total weight of the rubber and the thermoplastic combined.

The amount of thermoplastic polymer within the processable rubber compositions of the invention is generally from about 5 to about 95 percent by weight, preferably from about 10 to about 65 percent by weight and more preferably from about 20 to about 50 percent by weight of the total weight of the rubber and the thermoplastic combined.

The amount of thermoplastic polymer within the processable rubber compositions of the invention is generally from about 5 to about 95 percent by weight, preferably from about 10 to about 65 percent by weight and more preferably from about 20 to about 50 percent by weight of the total weight of the rubber and the thermoplastic combined.

As noted above, the processable rubber compositions and shaped articles of the invention include a cured rubber and a thermoplastic polymer. Preferably, the compositions comprise a thermoplastic vulcanizate wherein the rubber is in the form of finely-divided and well-dispersed rubber particles within a non-vulcanized matrix. It should be understood, however, that the thermoplastic vulcanizates of the this invention are not limited to those containing discrete phases inasmuch as the compositions of this invention may also include other morphologies such as co-continuous morphologies. In especially preferred embodiments, the rubber particles have an average particle size smaller than about 50 µm, more preferably smaller than about 25 µm, even more preferably smaller than about 10 µm or less, and still more preferably smaller than about 5 µm.

The reprocessability of the rubber compositions of the invention may be exploited to provide a method for reducing the costs of a manufacturing process for making shaped rubber articles. The method involves recycling scrap generated during the manufacturing process to make other new shaped articles. Because the compositions of the invention and the shaped articles made from the compositions are thermally processable, scrap may readily be recycled for re-use by collecting the scrap, optionally cutting, shredding, grinding, milling, otherwise comminuting the scrap material, and reprocessing the material by conventional thermoplastic techniques. Techniques for forming shaped articles from the recovered scrap material are in general the same as those used to form the shaped articles—the conventional thermoplastic techniques include, without limitation, blow molding, injection molding, compression molding, and extrusion.

The re-use of the scrap material reduces the costs of the manufacturing process by reducing the material cost of the method. Scrap may be generated in a variety of ways during a manufacturing process for making shaped rubber articles. For example, off-spec materials may be produced. Even when on-spec materials are produced, manufacturing processes for shaped rubber articles tend to produce waste, either through inadvertence or through process design, such as the material in sprues of injection molded parts. The re-use of such materials through recycling reduces the material and thus the overall costs of the manufacturing process.

For thermoset rubbers, such off spec materials usually can not be recycled into making more shaped articles, because the material can not be readily reprocessed by the same techniques as were used to form the shaped articles in the first place. Recycling efforts in the case of thermoset rubbers are usually limited to grinding up the scrap and the using the grinds as raw material in a number products other than those produced by thermoplastic processing technique.

The description of the invention is merely exemplary in nature and, thus, variations that do not depart from the gist of the invention are intended to be within the scope of the invention. Such variations are not to be regarded as a departure from the spirit and scope of the invention.

EXAMPLES

In Examples 1-11, the following materials are used:

Tecnoflon FOR 80HS is a bisphenol curable fluorocarbon elastomer from Solvay, with bisphenol curing agent formulated into the resin.

Tecnoflon P757 is a peroxide curable fluoroelastomer from Solvay.

Tecnoflon P457 is a low viscosity, medium fluorine (67%) peroxide curable fluoroelastomer from Solvay.

Tecnoflon FOR 50HS is a low viscosity cure incorporated fluoroelastomer from Solvay.

Tecnoflon FPA-1 is a high temperature processing aid from Solvay.

Dyneon BRE 7231X is a cured incorporated fluoroelastomer from Dyneon. It is based on a terpolymer of TFE, propylene, and vinylidene fluoride.

Fluorel FE 5840 is a high fluorine (70% F) cure incorporated fluoroelastomer from Dyneon.

Noxtite LV 2014 is a liquid fluorocarbon elastomer from Unimatec.

Sifel 3702A is a perfluoroether containing terminal crosslinkable siloxane groups, from Shin-Etsu.

Sifel 3702B is a curing system for Sifel 3702A.

Vamac is an ethylene acrylic elastomer from DuPont.

CBT is CBT®, a polyester oligomer sold by Cyclics Corporation, containing a polymerization catalyst.

Rhenofit CF is a calcium hydroxide from Rhein Chemie.

Elastomag 170 is a magnesium hydroxide powder from Rohm and Haas.

Struktol WS-280 is a processing aid from Struktol.

Luperco 101 XL is a peroxide crosslinker containing as an active ingredient 2,5,-dimethyl-2,5-di(tert-butylperoxy)hexyne-3.

TAIC is triallylisocyanurate.

MT Black is a carbon black filler.

Naugard 445 is a commercial antioxidant from Uniroyal.

Armeen 18 is octadecylamine from Akzo Nobel.

Vanfre BAM is an alkyl phosphate release for ethylene acrylic elastomers, from R.T. Vanderbilt.

Diak 1 is a diamine carbamate curative from DuPont Dow Elastomers.

DOTG is di-ortho-tolyl guanidine.

Noxtite PA-422 is an amine curable acrylic elastomer from Unimatec.

Cheminox ACZ-75 is a quaternary ammonium compound from Unimatec.

Nordel 1040 is an EPDM elastomer from DuPont.

Sunpar 2280 is a plasticizer from Sun Oil Company.

Varox 231 is a peroxide curing agent from R. T. Vanderbilt. The active peroxide is 1,1-bis(t-butylperoxy)-3,3,5-trimethyl,cyclohexane.

Varox DCP-4OKE is a peroxide crosslinking agent from R. T. Vanderbilt.

Agerite Resin D is an antioxidant from R. T. Vanderbilt.

Chemigum N698B is a peroxide curable NBR elastomer, from Eliokem.

Paraplex G25 is a plasticizer and softener from C.P Hall.

Examples 1-6 give recipes for dynamic vulcanization of fluorocarbon elastomers in the presence of an oligomer that polymerizes to form a thermoplastic material. The elastomeric materials are used at a level of 100 parts, and the oligomers are used at levels between 25 parts per hundred to 125 parts per hundred parts of the elastomer. Processable rubber compositions are made in batch or continuous processes.

Examples 7-11 illustrate the use of elastomers based on perfluoroether siloxane elastomers, AEM, ACM, EPDM, and NBR, respectively. Processable rubber compositions are made in a batch or continuous process

| Ingredient | Example 1a pphr | Example 1b pphr | Example 1c pphr | Example 1d pphr | Example 1e pphr |
|---|---|---|---|---|---|
| Tecnoflon FOR 80HS | 100.0 | 100.0 | 100.0 | 100.0 | 100.0 |
| CBT | 25.0 | 50.0 | 100.0 | 150.0 | 200.0 |
| Elastomag 170 (MgO) | 3.0 | 3.0 | 3.0 | 3.0 | 3.0 |
| MT Black (N990) | 30.00 | 30.00 | 30.00 | 30.00 | 30.00 |
| Struktol WS-280 | 1.00 | 1.00 | 1.00 | 1.00 | 1.00 |
| Tecnoflon FPA-1 | 1.00 | 1.00 | 1.00 | 1.00 | 1.00 |

| Ingredient | Example 2a pphr | Example 2b pphr | Example 2c pphr | Example 2d pphr | Example 2e pphr |
|---|---|---|---|---|---|
| Tecnoflon P757 | 100.0 | 100.0 | 100.0 | 100.0 | 100.0 |
| CBT | 25.0 | 50.0 | 100.0 | 150.0 | 200.0 |
| Luperco 101 XL | 3.0 | 3.0 | 3.0 | 3.0 | 3.0 |
| TAIC, 75% Dispersion | 4.00 | 4.00 | 4.00 | 4.00 | 4.00 |
| ZnO | 5.00 | 5.00 | 5.00 | 5.00 | 5.00 |
| MT N-990 Carbon Black | 10.00 | 10.00 | 10.00 | 10.00 | 10.00 |

| Ingredient | Example 3a pphr | Example 3b pphr | Example 3c pphr | Example 3d pphr | Example 3e pphr |
|---|---|---|---|---|---|
| Tecnoflon P757 | 100.0 | 100.0 | 100.0 | 100.0 | 100.0 |
| CBT | 25.0 | 50.0 | 100.0 | 150.0 | 200.0 |
| Luperco 101 XL | 3.0 | 3.0 | 3.0 | 3.0 | 3.0 |
| TAIC, 75% Dispersion | 4.00 | 4.00 | 4.00 | 4.00 | 4.00 |
| ZnO | 5.00 | 5.00 | 5.00 | 5.00 | 5.00 |
| MT N-990 Carbon Black | 10.00 | 10.00 | 10.00 | 10.00 | 10.00 |

| Ingredient | Example 4a pphr | Example 4b pphr | Example 4c pphr | Example 4d pphr | Example 4e pphr |
|---|---|---|---|---|---|
| Tecnoflon FOR 50 HS | 100.0 | 100.0 | 100.0 | 100.0 | 100.0 |
| CBT | 25.0 | 50.0 | 100.0 | 150.0 | 200.0 |
| Elastomag 170 (MgO) | 3.0 | 3.0 | 3.0 | 3.0 | 3.0 |
| MT Black (N990) | 30.00 | 30.00 | 30.00 | 30.00 | 30.00 |
| Struktol WS-280 | 1.00 | 1.00 | 1.00 | 1.00 | 1.00 |
| Technoflon FPA-1 | 1.00 | 1.00 | 1.00 | 1.00 | 1.00 |

| Ingredient | Example 5a pphr | Example 5b pphr | Example 5c pphr | Example 5d pphr | Example 5e pphr |
|---|---|---|---|---|---|
| Fluorel FE5840 | 70.0 | 70.0 | 70.0 | 70.0 | 70.0 |
| Dyneon BRE 7231X | 30.0 | 30.0 | 30.0 | 30.0 | 30.0 |
| CBT | 25.0 | 50.0 | 100.0 | 150.0 | 200.0 |
| Rhenofit CF | 6.0 | 6.0 | 6.0 | 6.0 | 6.0 |
| Elastomag 170 | 3.0 | 3.0 | 3.0 | 3.0 | 3.0 |
| Struktol WS-280 | 1.0 | 1.0 | 1.0 | 1.0 | 1.0 |

-continued

| Ingredient | Example 5a pphr | Example 5b pphr | Example 5c pphr | Example 5d pphr | Example 5e pphr |
|---|---|---|---|---|---|
| Austin Black | 10.00 | 10.00 | 10.00 | 10.00 | 10.00 |
| Tecnoflon FPA-1 | 1.00 | 1.00 | 1.00 | 1.00 | 1.00 |

| Ingredient | Example 6a pphr | Example 6b pphr | Example 6c pphr | Example 6d pphr | Example 6e pphr |
|---|---|---|---|---|---|
| Unimatec Noxtite LV2014 | 100.0 | 100.0 | 100.0 | 100.0 | 100.0 |
| CBT | 25.0 | 50.0 | 100.0 | 150.0 | 200.0 |
| Luperco 101 XL | 3.0 | 3.0 | 3.0 | 3.0 | 3.0 |
| TAIC, 75% Dispersion | 4.00 | 4.00 | 4.00 | 4.00 | 4.00 |
| ZnO | 5.00 | 5.00 | 5.00 | 5.00 | 5.00 |
| MT N-990 Carbon Black | 10.00 | 10.00 | 10.00 | 10.00 | 10.00 |

| Ingredient | Example 7a pphr | Example 7b pphr | Example 7c pphr | Example 7d pphr | Example 7e pphr |
|---|---|---|---|---|---|
| Sifel 3702A | 50.0 | 50.0 | 50.0 | 50.0 | 50.0 |
| CBT | 25.0 | 50.0 | 100.0 | 150.0 | 200.0 |
| Sifel 3702B | 50.0 | 50.0 | 50.0 | 50.0 | 50.0 |

| Ingredient | Example 8a pphr | Example 8b pphr | Example 8c pphr | Example 8d pphr | Example 8e pphr |
|---|---|---|---|---|---|
| Vamac (AEM) | 100.0 | 100.0 | 100.0 | 100.0 | 100.0 |
| Naugard 445-antioxidant | 1.0 | 1.0 | 1.0 | 1.0 | 1.0 |
| Stearic Acid | 1.5 | 1.5 | 1.5 | 1.5 | 1.5 |
| Ameen 18 | 0.50 | 0.50 | 0.50 | 0.50 | 0.50 |
| Vanfre VAM | 1.00 | 1.00 | 1.00 | 1.00 | 1.00 |
| SRF Black (N774) | 65.0 | 65.0 | 65.0 | 65.0 | 65.0 |
| Diak No. 1 (curative) | 1.50 | 1.50 | 1.50 | 1.50 | 1.50 |
| DOTG (coagent) | 4.00 | 4.00 | 4.00 | 4.00 | 4.00 |
| CBT | 25.0 | 50.0 | 100.0 | 150.0 | 200.0 |

| Ingredient | Example 9a pphr | Example 9b pphr | Example 9c pphr | Example 9d pphr | Example 9e pphr |
|---|---|---|---|---|---|
| Noxtite PA-422 (ACM) | 100.0 | 100.0 | 100.0 | 100.0 | 100.0 |
| Naugard 445-antioxidant | 2.0 | 2.0 | 2.0 | 2.0 | 2.0 |
| Stearic Acid | 1.0 | 1.0 | 1.0 | 1.0 | 1.0 |
| HAF Carbon | 55.00 | 55.00 | 55.00 | 55.00 | 55.00 |
| N5-Soap | 4.00 | 4.00 | 4.00 | 4.00 | 4.00 |
| Cheminox ACZ-76 | 2.00 | 2.00 | 2.00 | 2.00 | 2.00 |
| CBT | 25.0 | 50.0 | 100.0 | 150.0 | 200.0 |

| Ingredient | Example 10a pphr | Example 10b pphr | Example 10c pphr | Example 10d pphr | Example 10e pphr |
|---|---|---|---|---|---|
| Nordel 1040 (EPDM) | 100.0 | 100.0 | 100.0 | 100.0 | 100.0 |
| Zinc Oxide | 5.0 | 5.0 | 5.0 | 5.0 | 5.0 |
| Carbon Black (N990) | 5.0 | 5.0 | 5.0 | 5.0 | 5.0 |
| Carbon Black (N550) | 65.00 | 64.00 | 65.00 | 65.00 | 65.00 |
| Sunpar 2280 (peroxide) | 20.00 | 20.00 | 20.00 | 20.00 | 20.00 |
| Varox 231 (antioxidant) | 8.00 | 8.00 | 8.00 | 8.00 | 8.00 |
| CBT | 25.0 | 50.0 | 100.0 | 150.0 | 200.0 |

| Ingredient | Example 11a pphr | Example 11b pphr | Example 11c pphr | Example 11d pphr | Example 11e Pphr |
|---|---|---|---|---|---|
| Chemigum N689B | 100.0 | 100.0 | 100.0 | 100.0 | 100.0 |
| Paraplex G25 | 10.0 | 10.0 | 10.0 | 10.0 | 10.0 |
| Carbon Black (N990) | 65.0 | 65.0 | 65.0 | 65.0 | 65.0 |
| Carbon Black (N550) | 35.00 | 35.00 | 35.00 | 35.00 | 35.00 |
| Varox DCP-40KE | 4.00 | 4.00 | 4.00 | 4.00 | 4.00 |
| Agerite Resin D | 1.50 | 1.50 | 1.50 | 1.50 | 1.50 |
| CBT | 25.00 | 50.00 | 75.00 | 100.00 | 125.00 |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for making a rubber composition comprising:
forming a mixture by combining an uncured or partially cured elastomeric material, a curing agent that reacts with the elastomeric material, and a reactive oligomer;
heating the mixture at a temperature and for a time sufficient to effect vulcanization of the elastomeric material and polymerization of the reactive oligomer, wherein mechanical energy is applied to mix the mixture during the heating step;
wherein the reactive oligomer comprises a compound that polymerizes to form a thermoplastic polymer matrix of the composition.

2. A method according to claim 1, wherein the elastomeric material comprises a fluorocarbon elastomer.

3. A method according to claim 1, wherein the elastomeric material comprises a diene rubber.

4. A method according to claim 1, wherein the elastomeric material comprises a silicone rubber.

5. A method according to claim 1, wherein the elastomeric material comprises an ethylene propylene rubber.

6. A method according to claim 2, wherein the fluorocarbon elastomer is selected from the group consisting of:
VDF/HFP,
VDF/HFP/TFE,
VDF/PFVE/TFE,
TFE/Pr,
TFE/Pr/VDF,
TFE/Et/PFVE/VDF,
TFE/Et/PFVE, and
TFE/PFVE.

7. A method according to claim 6, wherein the fluorocarbon elastomer also comprises cure site monomers.

8. A method according to claim 2, wherein the curing agent comprises a polyol.

9. A method according to claim 2, wherein the curing agent comprises a peroxide.

10. A method according to claim 3, wherein the curing agent comprises sulfur.

11. A method according to claim 1, wherein the oligomer polymerizes to form a thermoplastic polyester.

12. A method according to claim 11, wherein the oligomer polymerizes to form polybutylene terephthalate.

13. A method according to claim 11, wherein the oligomer is made by a process comprising combining a polyester linear and a depolymerization catalyst in an organic solvent, wherein the depolymerization catalyst comprises a tin compound or a titanium compound, and wherein the polyester linear is described by the formula

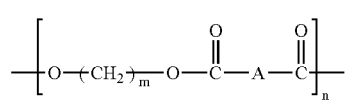

wherein m is from 2 to 10, n is from about 20 to about 500, and A is a divalent radical selected from the group consisting of alkylene, monocyclic aromatic, and polycyclic aromatic.

14. A method according to claim 11, wherein the oligomer is a macrocyclic polyester oligomer.

15. A method according to claim 1, wherein the oligomer polymerizes to form a thermoplastic polyamide.

16. A method according to claim 1, comprising a continuous process.

17. A method according to claim 16, carried out in a twin screw extruder.

18. A method according to claim 1, comprising a batch process.

19. A method according to claim 1, comprising
forming a mixture of the uncured or partially cured elastomer material and the reactive oligomer; and
simultaneously curing the elastomeric material and polymerizing the oligomer in the mixture;
wherein the oligomer polymerizes to form a thermoplastic material by ring opening or condensation polymerization.

20. A method according to claim 19, wherein the oligomer does not react with the elastomer.

21. A method according to claim 19, wherein the elastomeric material comprises a fluorocarbon elastomer.

22. A method according to claim 21, comprising curing the fluorocarbon elastomer with a phenolic curing agent.

23. A method according to claim 21, comprising curing the fluorocarbon elastomer with a peroxide curing system.

24. A method according to claim 19, wherein the oligomer polymerizes to form a thermoplastic polyester.

25. A method according to claim 19, wherein the oligomer polymerizes to form polybutylene terephthalate.

26. A method according to claim 1, comprising
combining the partially cured or uncured elastomeric material, the curing agent that reacts with the elastomeric material, and the reactive oligomer;
mixing the combination to form a homogeneous blend; and
heating the blend while mixing to effect cure of the elastomeric material and polymerization of the oligomer;
wherein the oligomer comprises a macrocyclic polyester oligomer.

27. A method according to claim 26, wherein the elastomeric material comprises a fluorocarbon elastomer.

28. A method according to claim 26, wherein the elastomeric material comprises a diene rubber.

29. A method according to claim 26, wherein the oligomer is prepared by depolymerizing polybutylene terephthalate in an organic solvent in the presence of a tin compound or a titanium compound.

30. A method according to claim 27, wherein the fluorocarbon elastomer comprises repeating units derived from tetrafluoroethylene and propylene.

31. A method according to claim 27, wherein the fluorocarbon elastomer comprises repeating units derived from vinylidene fluoride and hexafluoropropylene.

32. A method according to claim 26, comprising a continuous process.

33. A method according to claim 26, carried out in a twin screw extruder.

34. A method according to claim 26, comprising a batch process.

* * * * *